Patented Apr. 10, 1934

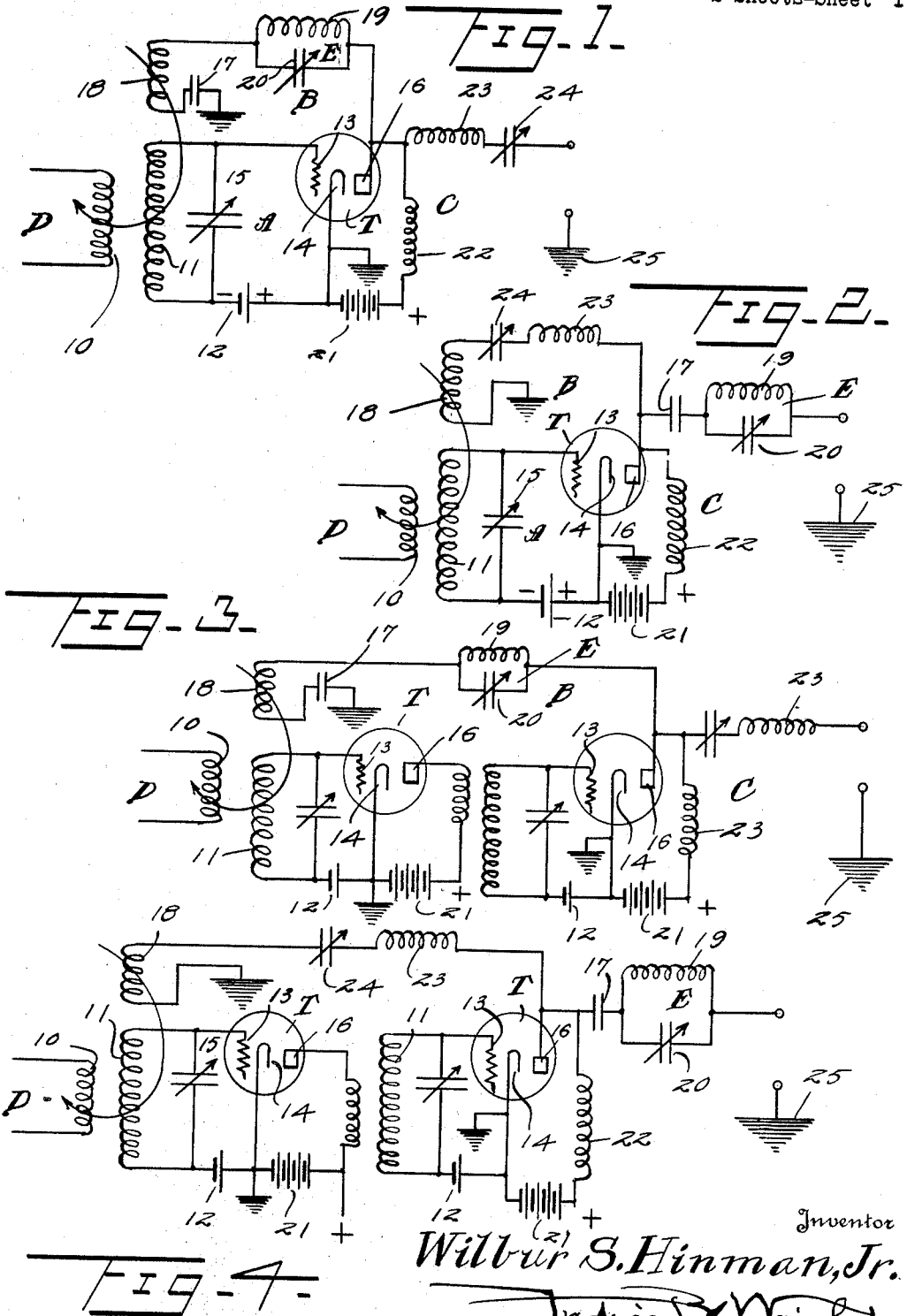

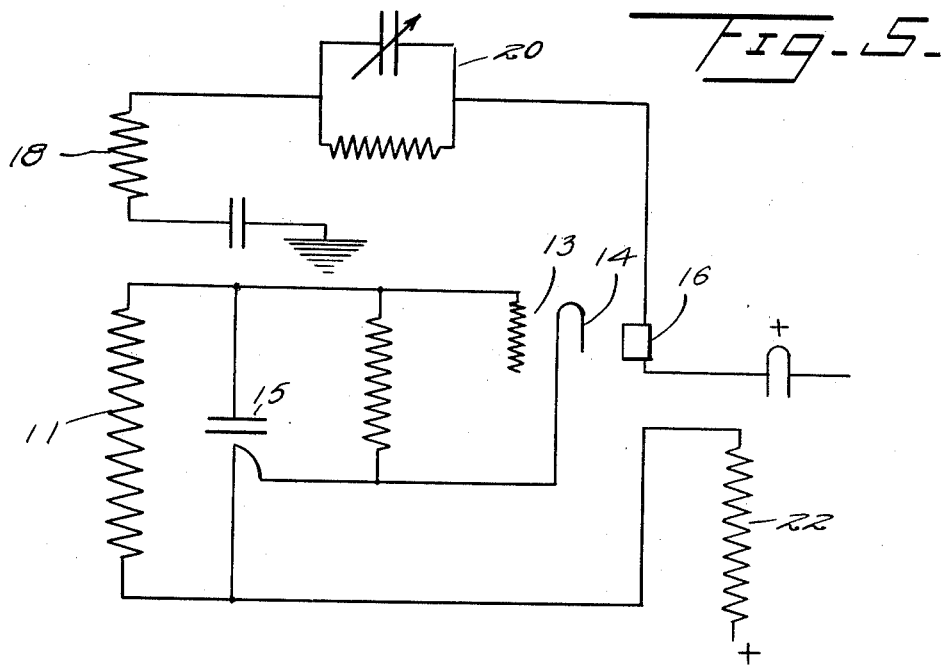
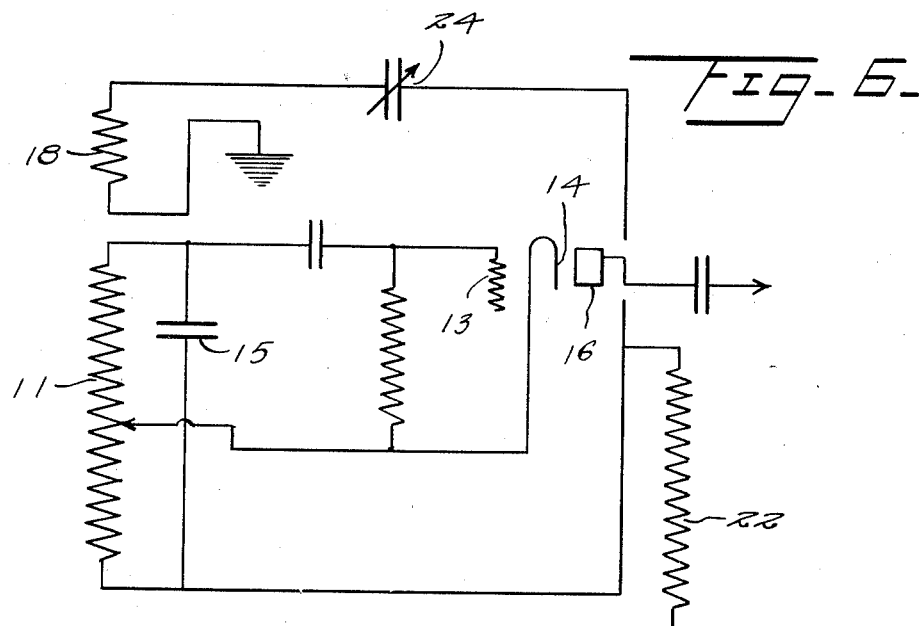

1,954,295

UNITED STATES PATENT OFFICE 1,954,295

FILTER FOR RADIO SIGNALS

Wilbur S. Hinman, Jr., Falls Church, Va.

Application April 5, 1930, Serial No. 441,926

12 Claims. (Cl. 178—44)

This invention relates to means for filtering radio signals either in sending or receiving and particularly to means whereby a desired signal of a certain frequency may be either permitted to pass into the output circuit of a radio set and all other signals having a different frequency filtered out or whereby a signal having a certain frequency may be prevented from passing into the output circuit, while all signals having different frequencies are permitted to pass. In other words, it is an object of my invention to either block out all signals except the one desired or to block out an undesired signal and let all other signals pass.

In the accompanying drawings:—

Figure 1 is a diagram of a hook-up whereby the elimination of all signals except of one frequency may be attained;

Figure 2 is a diagram of a hook-up whereby a signal of one frequency may be eliminated and signals of all other frequencies may pass;

Figures 3 and 4 are diagrams of the same character as Figures 1 and 2 respectively, but wherein the filtering action is carried on through two or more tubes.

Figure 5 is a diagram showing a modification of the arrangement of the wiring shown in Figure 1;

Figure 6 is a diagrammatic view illustrating a series tuned circuit and a reactance coil.

Referring particularly to Figure 1, 10 designates the coil of an input circuit, connected as usual to an aerial and ground. The grid tuning circuit A includes the secondary coil 11, the "C" battery 12, grid 13 and filament 14 of tube T.

Connected across the circuit is the variable condenser 15. The circuit is grounded between the filament and the positive pole of battery 12. The plate 16 is disposed in a "feed back" circuit B, which includes the coil 18, condenser 17 and ground.

Coil 18 is coupled to coil 11 in such manner (as by so winding coil 18 that its currents are out of phase (displaced 180°) with the currents in circuit A) that the current in coil 18 is opposing that in coil 11. Under these circumstances any current or voltage in or across circuit A is amplified by tube T and fed back through coil 18. Since the currents in coil 18 opposed those in coil 11, the currents in coil 11 are cancelled, thus reducing the voltage on the grid 13 and making the circuit dead. If now an impedance (which may be formed by a tuned circuit E having therein a coil 19 connected across its ends to a variable condenser 20 and which will present a very high impedance at one frequency but a very low impedance at all others) be placed between coil 18 and plate 16, that frequency against which it presents a very high impedance will be blocked out of coil 18 and must take the low impedance path through the coil 23, tuned by condenser 24, in the output circuit. This output circuit includes the radio frequency choke coil 22 and coil 23, the variable condenser 24 (forming a series tuned circuit), the "B" battery 21 and ground 25. It will be obvious that the output circuit accepts the frequency to which it is tuned, but rejects all other frequencies. The circuits A, B and C, it is also to be understood, are all tuned to the same frequency.

Thus it will be seen that all other frequencies will pass through coil 18 and will cancel their corresponding frequencies in coil 11 and circuit A.

At the output, there will be only one frequency which will be that blocked out of coil 18 by the tuned circuit E. The cycle repeats until all the currents, except the current of the desired frequency which is fed to the output, pass through coil 18 until they cancel themselves.

In Figure 2, the positions of the high and low impedances E and coil 23 and condenser 24 are reversed so that one frequency may be eliminated and all others used. In this figure, the input coil 10 and the circuit are as previously described, but the plate is connected in a circuit including the coil 23, the variable condenser 24, (forming together a series tuned circuit), the coil 18, condenser 17 and ground, while the tuned circuit E with blocking condenser 17 forms part of the output circuit C. In the hook-up just described, circuit A is tuned to the frequencies it is desired to receive, while B and E are tuned to the frequency it is desired to eliminate. The coil 19 and variable condenser 20 offer a high impedance to the frequency to which it is tuned, but a low impedance to all others.

The circuit including coil 23, variable condenser 24, coil 18 and the plate 16 offers a low impedance to the frequency to which it is tuned, but a high impedance to all other frequencies. Hence the undesired signal is blocked out of the tuned circuit and forced to take the path through the series tuned circuit formed by coil 23 and variable condenser 24 to coil 18 where it eliminates the incoming signal of the same frequency as explained in connection with Figure 1.

In Figure 3, I illustrate the application of the circuits shown in Figure 1 to a set having two or more tubes and in Figure 4, I show the application of the circuits shown in Figure 2 to two or more tubes. It is to be understood that the coil 18 must be wound so that the currents set up in it are out of phase (displaced 180°) with the current of the coil 11 to which it is coupled. This coil 18 must have sufficient turns to eliminate in the coil to which it is coupled those currents which it, coil 18, contains.

While I have heretofore described my novel filtering means as used in the reception of signals, yet it is to be understood that the filtering means may be used in the generation and transmission of signals and that this is within the purview of my invention and that it is also within the scope of my invention to use the above described circuits for the filtering of any frequency or frequencies.

In this case the circuit shown in Figure 1 or Figure 2 (or Figures 3 or 4) is placed in the transmission circuit either between the oscillator and amplifier or as part of the amplifier or oscillator system and will accept the desired frequency and reject all others, as in Figure 1, or reject one frequency and accept all others as in Figure 2.

If this circuit above referred to and described is to be used as part of the oscillator circuit, the system will be substantially as follows:—The tuning coil 11 is connected as a Hartley oscillator, the fundamental signal generated passing through a series tuned circuit including coil 23 and variable condenser 24 to the plate end of the tuning coil, coils 19 and condenser 20 being connected as in Figure 2 to form circuit B.

It is within the purview of my invention to substitute a resistance or impedance for the tuned output circuit composed in Figure 1 of the coil 23 and condenser 24 or in Figure 2 of the coil 19 and condenser 20.

The current in coil 18, being out of phase with the current of tuned circuit 11, will tend to suppress oscillations.

In the operation of my device, it will be noted that the thermionic valve amplifies the currents as they come into the system and that all the undesired currents feed back through coil 18 to coil 11, but out of phase by 180°.

I am aware of the British patents, Number 258,969 of 1926 and Number 249,667 of 1925, but these patents do not secure the effect I desire to secure or secure this effect in the same way because in these British patents, the coupling back is secured by throwing a high impedance in the path of the received signal, whereas by my method, I do not throw a high impedance in said path, but cancel the currents in the path of the input circuit by bucking them against other currents of the same frequency in the input circuit which are opposite in phase, that is, displaced 180°.

I claim:

1. In a tuned filter for radio signal sending or receiving apparatus, an input circuit, an amplifier circuit coupled thereto and including the emission element and grid of a thermionic valve, a control circuit inductively coupled to the input side of the amplifier circuit and including the plate of the valve, and an output circuit connected to said control circuit and to the plate of the valve, one of the two last-named circuits being tuned to the frequency of a desired signal current and offering a high impedance to currents of this frequency and a low impedance to all others and the other of the two last-named circuits being tuned to offer a low impedance to a desired frequency and a high impedance to all other frequencies.

2. In a tuned filter for radio signal sending or receiving apparatus, an input circuit, an amplifier circuit coupled thereto and including the emission element and grid of a thermionic valve, a control circuit inductively coupled to the input side of the amplifier circuit and including the plate of the valve, and an output circuit connected to said control circuit and to the plate of the valve, one of the two last-named circuits containing a reactance coil and a condenser arranged in parallel and providing a path of high impedance to the passage of a desired frequency and of low impedance to the passage of all other frequencies and the other of the two last-named circuits containing a reactance coil and condenser in series providing a path of low impedance to a desired frequency and of high impedance to all other frequencies.

3. In a tuned filter for radio signal sending or receiving apparatus, an input circuit, an amplifier circuit coupled thereto and including the emission element and grid of a thermionic valve, a control circuit inductively coupled to the input side of the amplifier circuit and including the plate of the valve, and an output circuit connected to said control circuit and to the plate of the valve, the said control circuit being tuned to the frequency of a desired signal current and offering a high impedance to currents of this frequency and a low impedance to currents of all other frequencies and the said output circuit offering a low impedance to a certain frequency and a high impedance to all other frequencies.

4. In a tuned filter for radio signal sending or receiving apparatus, an input circuit, an amplifier circuit coupled thereto and including the emission element and grid of a thermionic valve, a control circuit inductively coupled to the input side of the amplifier circuit so as to oppose the field in the input circuit and including the plate of the valve, and an output circuit connected to said control circuit and to the plate of the valve, one of the two last-named circuits being tuned to the frequency of a desired signal current and offering a high impedance to currents of this frequency and a low impedance to all others and the other of the two last-named circuits being tuned to offer a low impedance to a certain frequency and a high impedance to all other frequencies.

5. In a tuned filter for radio signal sending or receiving apparatus, an input circuit, an amplifier circuit, transformer coils inductively connecting said circuits, the amplifier circuit including the emission element and grid of a thermionic valve, a control circuit including the plate of the valve and a coil whose currents are at a phase angle to the currents in the transformer coil in the amplifier circuit, and an output circuit connected to the control circuit and plate of the valve, one of the two last-named circuits containing a reactance coil and a condenser arranged in parallel and providing a path of high impedance to the passage of a desired frequency and of low impedance to the passage of all other frequencies and the other of the two last-named circuits containing a reactance coil and condenser in series providing a path of low impedance to a desired frequency and of high impedance to all other frequencies.

6. In a tuned filter for radio signal sending or receiving apparatus, an input circuit, an amplifier circuit, transformer coils inductively connecting said circuits, the amplifier circuit including the emission element and grid of a thermionic valve, a control circuit including the plate of the valve and a coil, the currents of which are at a phase angle to the currents in the transformer coil in the amplifier circuit, and an output circuit connected to the control circuit and plate of the valve, the said control circuit being tuned to the frequency of a desired signal current and offering a high impedance to currents of this frequency and a low impedance to currents of all other frequencies and the said output circuit offering a low impedance to a certain frequency and a high impedance to all other frequencies.

7. Radio signal sending or receiving apparatus including an amplifier and two output circuits, one of the output circuits being so coupled to the input of the amplifier that said output circuit suppresses currents of any frequency which are allowed to flow through that particular output circuit, the second output circuit permitting the flow of currents of only such frequency which have been excluded by the first output circuit, the second output circuit being the output of the filter.

8. A method of filtering radio signals which consists in presenting to currents of various frequencies a path whose impedance is low to the desired frequency and high to the undesired frequency, and a second path which is low to currents of undesired frequency and high to the currents of desired frequency, thereby suppressing the undesired frequencies.

9. A method of filtering radio signals which consists in presenting to currents of various frequencies a path whose impedance is low to the desired frequency and high to the undesired frequency and a second path which is low to currents of undesired frequencies and high to currents of desired frequencies, which second path leads to a coil so coupled to a grid circuit that its field opposes the field of the coil in the grid circuit, thereby suppressing these undesired frequencies.

10. A method of filtering radio signals which consists in using the current of all the various frequencies to generate a field and amplifying said currents, presenting to the various frequencies a path whose impedance is low to the desired frequencies and high to the undesired frequencies and a path which is high to the desired frequencies and low to the undesired frequencies and utilizing the currents of undesired frequencies which passes over said last named path to generate a field which opposes and eliminates the first named field.

11. A method of filtering radio signals which consists in presenting to currents of various frequencies, a path whose impedance is high to the desired frequency or frequencies and low to the undesired frequency or frequencies, which path leads from the output of a radio amplifier to a coil so coupled to the input circuit that its field opposes a field in the input circuit, thereby eliminating the undersired frequency or frequencies.

12. A method of filtering radio signals which consists in using the current of various frequencies to generate a field and amplifying the currents, presenting to those various frequencies a path whose impedance is high to the desired frequency or frequencies and low to the undesired frequency or frequencies and utilizing the currents of undesired frequencies which passes over said path to generate a field which opposes the first named field.

WILBUR S. HINMAN, Jr.